United States Patent [19]

Griffiths

[11] Patent Number: 4,574,654

[45] Date of Patent: Mar. 11, 1986

[54] SELECTIVELY ENGAGEABLE LINEAR POWER ACTUATOR

[76] Inventor: Edward E. Griffiths, 3200 Polaris St. #23, Las Vegas, Nev. 89102

[21] Appl. No.: 575,057

[22] Filed: Jan. 30, 1984

[51] Int. Cl.[4] ........................ G05G 11/00; F16H 51/00

[52] U.S. Cl. ........................................ 74/625; 74/479; 74/522

[58] Field of Search .................... 741/625, 471 R, 479, 741/480 R

[56] References Cited

U.S. PATENT DOCUMENTS

| | | | |
|---|---|---|---|
| 2,965,181 | 12/1960 | Senkowski | 74/480 R |
| 4,240,304 | 12/1980 | Griffiths | 74/471 R |
| 4,306,314 | 12/1981 | Griffiths | 251/131 |

*Primary Examiner*—Lawrence J. Staab

*Attorney, Agent, or Firm*—Linval B. Castle

[57] ABSTRACT

A remotely controllable linear power actuator for the control of manually operable hydraulic valve handle or the like. A down-geared motor drives an adjustable friction slip clutch connected to a plate that can be rotated around the axis of the clutch by operation of the motor. A freely movable second plate is pivotally connected to the first elongated plate and the linearly movable output shaft is connected to the opposite end of the second plate. Thus, until the two plates are interconnected against pivotal rotation the output shaft which is connected to the valve handle may be easily moved manually. A solenoid interlock on one plate may be actuated to force the solenoid armature, or a steel ball driven by the armature, into a corresponding hole in the other plate to thereby connect the two plates at some point distant from the pivot pin.

6 Claims, 8 Drawing Figures

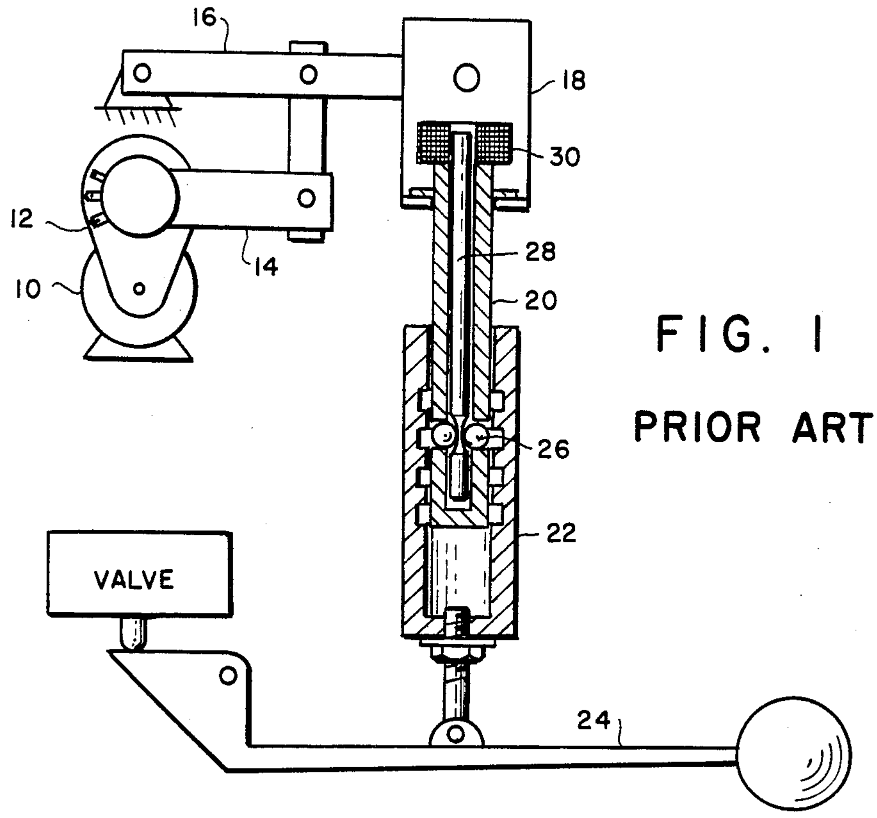
FIG. 1
PRIOR ART
FIG. 2
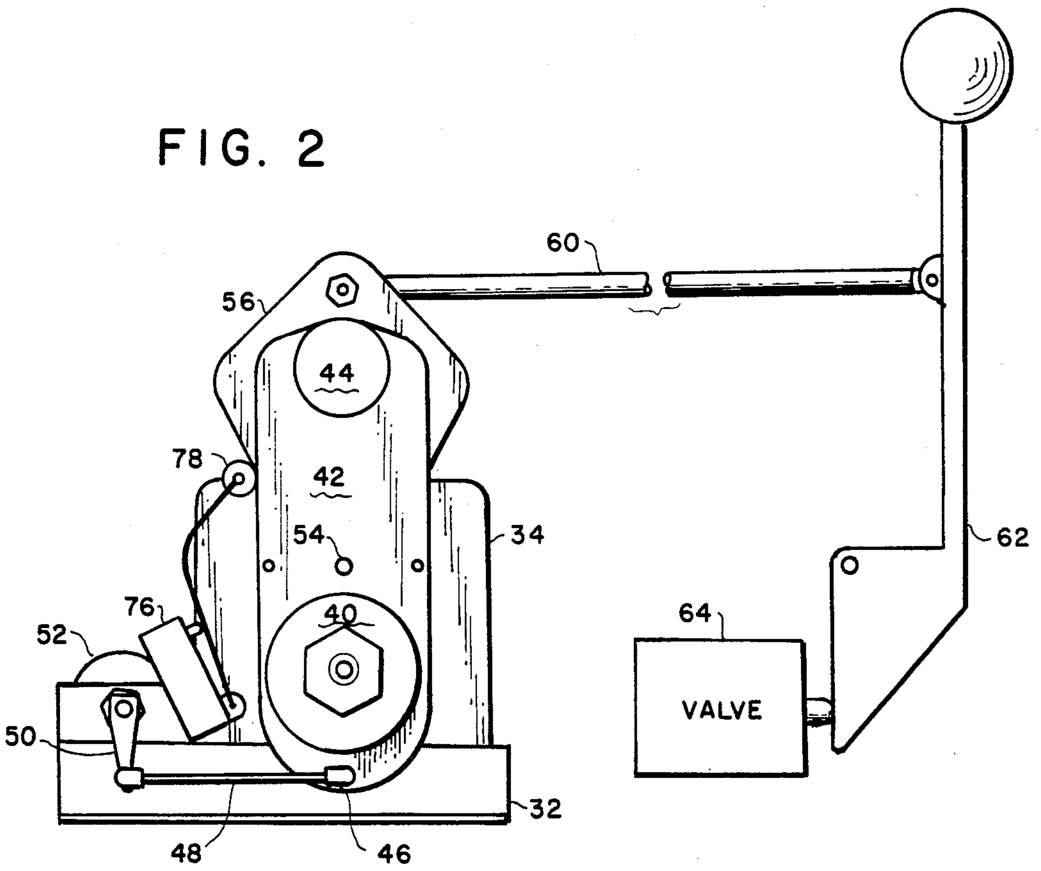

SELECTIVELY ENGAGEABLE LINEAR POWER ACTUATOR

BRIEF SUMMARY OF THE INVENTION

This invention relates generally to linear actuators and in particular to a bi-direction actuator having a solenoid-operated release mechanism providing either manual or motor operation of the linear drive rod and a control arm or lever to which it may be attached.

Powered linear actuators are well known and two of such prior art actuators are described in my U.S. Pat. Nos. 4,240,304, issued on Dec. 23, 1980, and 4,306,314, issued on Dec. 15, 1981. Such actuators may be used for the accurate and reliable remote control of equipment brake controls, throttle levers, gear shifts and similar mechanical devices and are particularly valuable for use on heavy equipment being used in hazardous environments.

While the actuator disclosed herein performs similar functions to those of the prior art, it is a more compact and powerful unit and may be constructed on a relatively large scale to provide very high linear forces but with high positioning accuracy to various devices or structures. The actuator is being described in the preferred embodiment for the operation of a hydraulic control valve lever which, because of the power release feature, may be either manually operated or motor controlled. Because the actuator is compact, it is a very flexible, modular unit which may be added to many existing control systems to provide an additional output. The actuator module to be described includes a housing for its servo circuitry so that a total control system may be assembled by incorporating several of the actuator modules on one enclosed controller chassis with only the output shafts of each actuator extending from the system housing and electrical connectors in the chassis for entering the desired control signals.

Briefly described, the actuator of the invention comprises a reversible electrical motor driving a geared speed reducer which is coupled to a slip clutch attached to a drive plate rotatable about the slip clutch's axis. A free swinging second drive plate is pivotally coupled to the motor driven drive plate and the linear output shaft is coupled to the upper end of the second drive plate opposite the plate pivotal coupling. A solenoid mounted on the motor driven drive plate is operable to interconnect the two plates so that the output drive shaft may be freely moved when the solenoid disengages the two plates, or is driven by the motor when the two plates are interconnected by the solenoid.

DESCRIPTION OF THE DRAWINGS

In the drawings which illustrate the preferred embodiment of the invention:

FIG. 1 is a sectional view illustrating a prior art linear actuator;

FIG. 2 is a front elevation view of the linear actuator of the invention adapted to control a hydraulic valve control lever;

DETAILED DESCRIPTION

Figure 3:
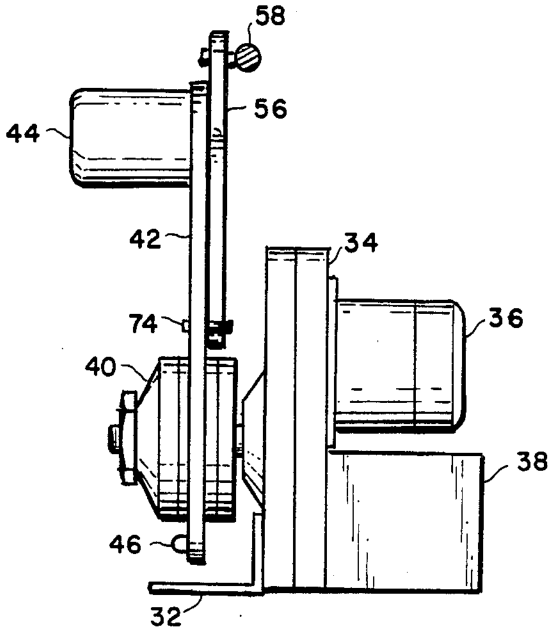
FIG. 3 is a side elevation view of the actuator.

FIG. 1 is a sectional elevation view of a prior art valve control actuator such as shown and described in my aforementioned U.S. patents. In FIG. 1 a drive motor 10 is connected to reducing gears 12 which drive a slip clutch connected to arm 14. Rotation of the motor 10 in response to an external control signal causes the arm 14 to raise or lower the lever 16 and the housing 18 to which is coupled a drive tube 20. The tube 20 telescopes into a driven tube 22 which is coupled to a valve control handle 24. A locking interconnection between the driving tube 20 and driven tube 22 is made by two or more small steel balls 26 that are housed within radial holes in the driving tube 20 and which are forced outward into annular grooves in the bore of the driven tube 22 by the raising of a control rod 28 having a section of reduced diameter that permit the balls to fall clear of the bore of the driven tube 22, but which may be raised by a solenoid 30 in the housing 18 to force the balls into engagement with the annular grooves of tube 22 and the radial holes in the tube 20. Such a system operates quite satisfactorily, however any accidental denting of the tubes can cause failure of the system.

FIG. 2 is a front elevation view illustrating my improved linear actuator. The entire actuator assembly, including the servo circuitry, is mounted to an angle mounting member 32 and includes a gear assembly 34 for reducing the rotation speed of the electrical motor 36 illustrated in the side elevation view of FIG. 3. The motor 36 is mounted to the housing of the gear assembly 34 and a servo circuitry contained within a housing 38 is also mounted to the gear housing 34 and beneath the motor 36.

As illustrated in FIGS. 2 and 3 the output shaft of the gear assembly 34 is connected to an adjustable clutch 40 which is frictionally connected to a drive plate 42 so that the plate may rotate about the axis of the clutch upon operation of the motor 36. The drive plate 42 is preferably rectangular and should have a thickness suitable for supporting a solenoid 44 adjacent the top end of the plate. The lower end of the plate 42 extends below the axis and housing of the clutch 40 and the outer surface of this lower extension carries a small ball connector to which is connected a socket 46 on the first end of a shaft 48, the second end of which is coupled to a connector on the end of a lever arm 50 connected to the input shaft of potentiometer 52 which tracks the rotational movement of the drive plate 42 and applies the resulting tracking signals to the closed loop servo circuitry contained in the servo housing 38.

Centrally positioned through the drive plate 42 and slightly above the exterior edge of the clutch 40 is a pivotal fastener or pivot pin 54 which couples the lower end of a second or free swinging drive plate 56 to the drive plate 42 so that the free plate 56 may rotate about the pivot pin 54. At the upper or opposite end of the free plate 56 is a swivel connector 58 to which is connected one end of an output drive shaft 60 that preferably extends outward at an angle substantially perpendicular to the vertical or neutral positions of the drive plate 42 and free plate 56, as best illustrated in FIG. 1. In the preferred embodiment, the outer or opposite end of the shaft 60 is pivotally coupled to a valve control handle 62 which, at this point in the description, may be freely moved manually to open or close a hydraulic valve 64.

Figure 4:
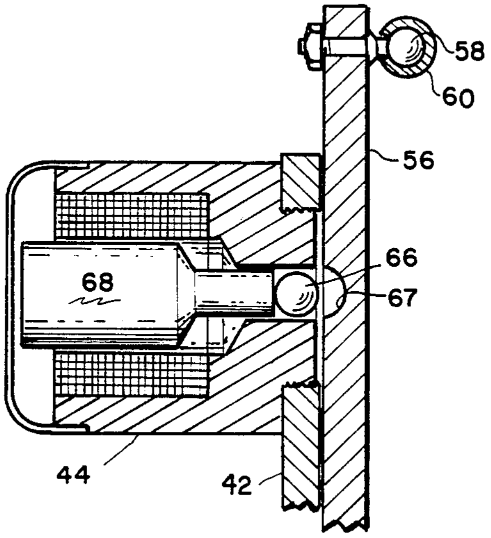
FIG. 4 is a sectional view illustrating the details of the solenoid drive plate interconnector.

The free drive plate 56 may be firmly coupled to the drive plate 42 so that is cannot rotate freely about its pivot pin 54 by operation of the solenoid 44, as best illustrated in FIG. 4. The interconnection between the plates 42 and 56 is made by a steel ball 66 which normally lies within the armature bore of the solenoid 44 and which is forced into a hemispherical indentation 67, normally on the central longitudinal axis of the plate but capable of being positioned at any desired point on an arc in the free plate 56, by excitation of the solenoid and the resulting force exerted against the ball 66 by the moving armature 68. Therefore the armature housing which is screwed into a mating threaded hole in the drive plate 42 becomes firmly connected by the ball 66 to the driven plate 56 at a point at which the long axis of the driven plate is normally parallel with the longitudinal axis of the drive plate 42, as illustrated in FIG. 2.

Figure 7:
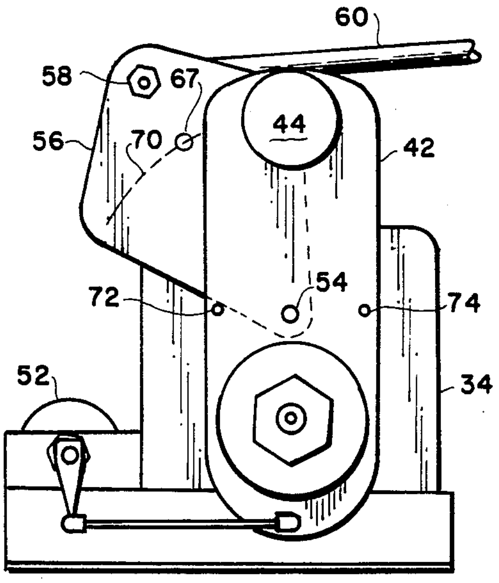
FIG. 7 is a front elevation view illustrating manual actuation of the output shaft toward the left.

It will be noted that the free driven plate 56 and an elongated diamond shape with the pivot pin 54 at the elongated end and the swivel connector 58 at the shorter end. The purpose for this configuration is best illustrated in FIG. 7 which illustrated the solenoid center, or interconnector ball position, at the end of the arc (shown by the dashed line 70) that extends between first and second side corners of the diamond shaped free plate 56 and is a portion of a circle having its center at the pivot pin 54 and a radius equal to the spacing between the pivot pin 54 and the center of the solenoid 44. The diamond configuration therefore permits the free plate 56 to swing from one side to the other without danger of losing the interconector ball 66 from its position in the solenoid armature bore. It will also be noted that the degree of swing of the free plate 56 about its pivot point is limited by limit pins 72 and 74 in the drive plate 42, as shown in FIG. 7. The limit pins extend from the rear surface of the drive plate as shown in FIG. 3 and operate as stops which limit the movement of the driven plate 56 with respect to the drive plate 42. FIG. 7 illustrates the driven plate 56 at its left rotation limit and against the pin 72.

Figure 5:
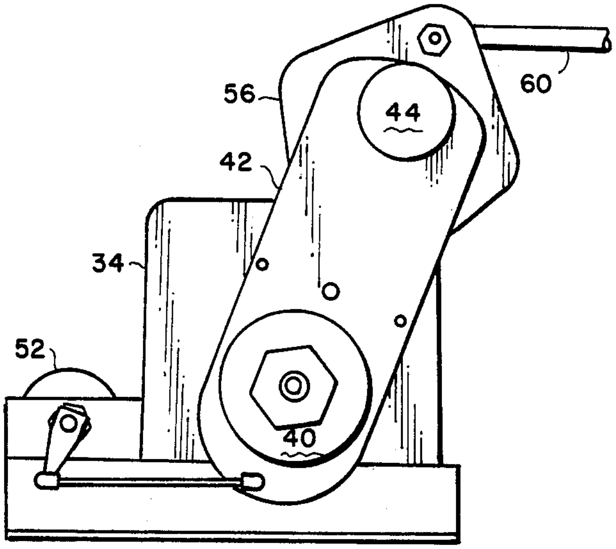
FIG. 5 is a front elevation view illustrating the motor driven actuation of the valve control lever.
Figure 8:
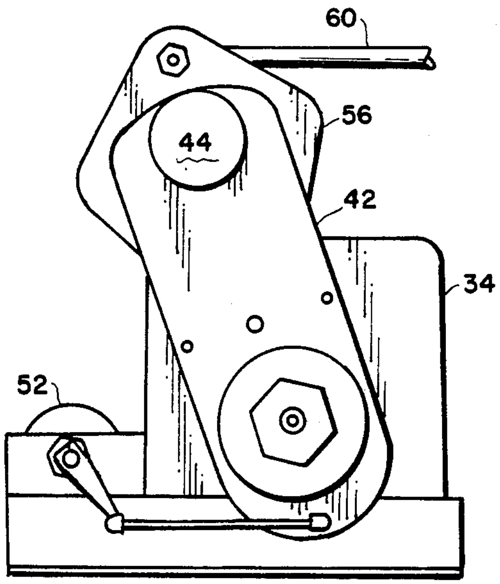
FIG. 8 is a front elevation view illustrating motor actuation of the output shaft toward the left.

In operation, the valve control handle 62 may be manually operated when the solenoid 44 is not excited and its armature is retracted to permit the ball 66 to be disengaged from the hemisperical hole 67 in the free plate 56, as illustrated in FIG. 4. In this condition, movement of the valve control handle will cause the plate 56 to pivot freely on its pivot pin 54 between the limits provided by the limit pins 72 and 74. When power actuation of the valve control handle is desired. the solenoid 44 is activated to drive the ball 66 into the hemisperical hole 67 and to lock together the drive plate 42 and free plate 56. Now, rotation of the positioning motor under control of a remote operator and the servo circuitry in the housing 38 will force rotation of the drive plate 42 through the adjusted friction clutch 40 to drive the connected drive plate 42 and free plate 56 to the desired location as determined by the feedback signal from the potentiometer to the closed loop servo circuitry. If the remote operator directs the system toward the right the drive plates 42 and 56 will both pivot clockwise as shown in FIG. 5; if driven to the left, the plates will pivot couterclockwise as shown in FIG. 8.

Figure 6:
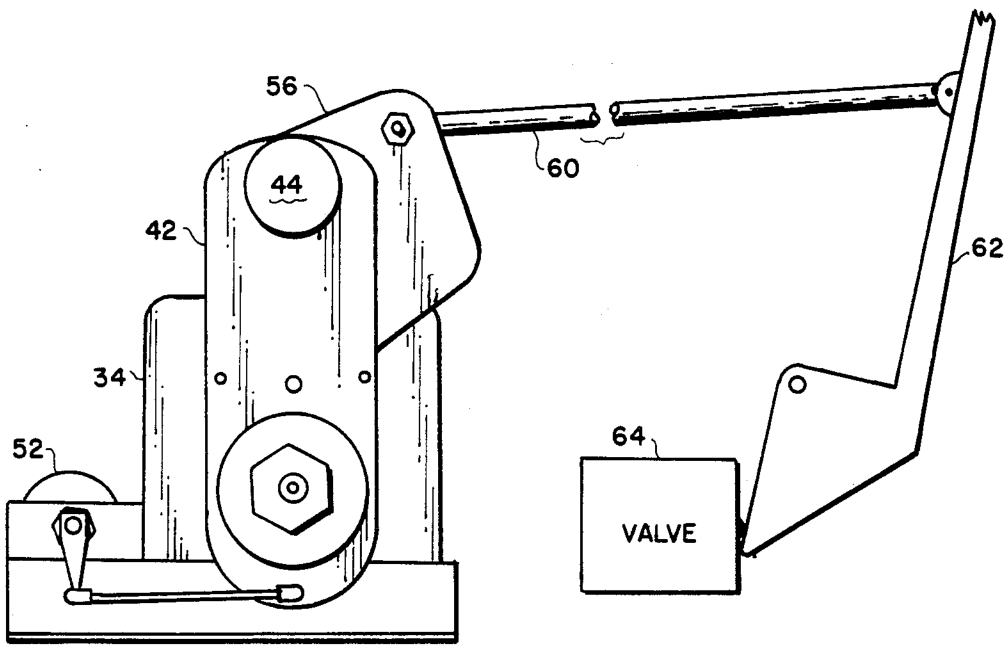
FIG. 6 is a front elevation view illustrating a manually driven actuation of the valve control lever.

In the free operation position, the solenoid armature 68 is retracted and the ball falls from the hemisperical hole 67 in the plate 56. The free plate 56 is now free from the drive mechanism and may be moved either clockwise as shown in FIG. 6, or counterclockwise as shown in FIG. 7 by external linear movement of the output drive shaft 60.

If it is desired to interconnect or to disengage the two plates 42 and 56 in one position, a position indicator may be incorporated in the system to signal coalignment of the axes of the two plates. Such a position indicator may take the form of an electro-optic switch (not shown) in which a small LED light source attached to the external surface of one of the plates 42 or 56 projects a light beam through a hole in its plate and through a hole in the second plate to a light sensor on the opposite surface of the second plate. When the two holes are axially aligned, the sensor will signal that proper alignment of the plates have occured and that they may be interconnected by operation of the solenoid 44.

Other types of positioning indicators may be employed to signal alignment of the two plates 42 and 56. FIG. 2 shows the use of a microswitch 76 having a long flexible arm terminating in a roller 78 that engages the edges of both plates 42 and 56. The switch is positioned so that it switches from one condition to the other at the point where both plates 42 and 56 are in the vertical or neutral positions to signal that either or both of the plates are vertical. Other types of position detectors may be employed, such as the placing of a microswitch under the bottom of the drive plate 42 with the activating button of the switch engaging a cam or notch in the bottom surface of the plate to signal the vertical positioning of the plate. The microswitch positioning indicator 76 is illustrated as an example, only in FIG. 2, and is omitted from the remaining figures for clarity.

Having thus described the invention, what I claim is:

1. A remotely controlled linear power actuator with selective disengagement means for permitting free manual movement of the actuator, said linear actuator comprising:

- an electrical motor having its output shaft connected to a gear assembly for reducing the output speed of said motor;
- closed loop servo circuitry controlled by a remotely located operator and controlling the rotation of said motor;
- an adjustable friction slip clutch coupled to the output shaft of said gear assembly;
- an elongated drive plate having first and second ends and an outer face and an inner face, a point substantially on the center line and near the first end of said plate being connected to the output of said slip clutch, said plate being rotatable about the output axis of said clutch;
- a substantially diamond shaped second drive plate having first and second opposite points and two opposite side points, said second drive plate being in a plane substantially parallel with the plane of said elongated drive plate and having the first point of said diamond coupled by pivot means to the inner face of said elongated drive plate at a point on the longitudinal center line of said elongated plate between said first and second ends;
- an output shaft pivotally connected to said second drive plate adjacent the second point of said diamond, said shaft being positioned substantially perpendicular to the axis formed between said first and second diamond points; and
- interlocking means between the inner face of said elongated plate and said diamond shaped plate and controllable from a remote location for selectively connecting said plates against rotation around said pivot pin, said interlocking means including a remotely controlled solenoid mounted on the outer face of said elongated drive plate and having an armature bore aligned with an opening through said drive plate and substantially on the longitudinal center line of said of said elongated drive plate and upon an arc centered on said pivot means and formed between the two side points of the diamond shape of said second drive plate, the electrical actuation of said solenoid driving an interconnector ball in the bore of said solenoid into said opening and an indentation in said arc.

2. The linear power actuator claimed in claim 1 further including servo feedback signalling means coupled to said elongated plate for providing elongated plate position signals to said servo circuitry.

3. The power actuator claimed in claim 2 wherein said servo feedback signalling means is a potentiometer mounted a a section of housing supporting said power actuator, the rotational shaft of said potentiometer being connected to an arm the end of which is coupled to the first end of a shaft that is coupled at its second end to the first end of said elongated rectangular plate.

4. The power actuator claimed in claim 3 further including centering signalling means for generating an electrical output signal indicating a neutral rotational position of said elongated plate.

5. The power actuator claimed in claim 3 further including centering signalling means for generating an electrical output signal indicating a neutral position of said elongated plate and said diamond shaped plate.

6. The linear power actuator claimed in claim 3 further including limit pins extending from the inner face of said elongated plate for limiting the extent of rotation of said second drive plate about said pivot means and for retaining said interconnector ball between the opening aligned with said solenoid armature bore and said second drive plate.

* * * * *